(12) United States Patent
Yan et al.

(10) Patent No.: US 10,538,328 B2
(45) Date of Patent: Jan. 21, 2020

(54) SYSTEM AND METHOD FOR SELECTING AN OPERATION MODE OF A MOBILE PLATFORM

(71) Applicant: SZ DJI TECHNOLOGY CO., LTD., Shenzhen (CN)

(72) Inventors: Jiaqi Yan, Shenzhen (CN); You Zhou, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 90 days.

(21) Appl. No.: 15/844,252

(22) Filed: Dec. 15, 2017

(65) Prior Publication Data

US 2018/0105269 A1 Apr. 19, 2018

Related U.S. Application Data

(63) Continuation of application No. PCT/CN2015/082524, filed on Jun. 26, 2015.

(51) Int. Cl.
| | | |
|---|---|---|
| *B64C 39/02* | (2006.01) | |
| *G01C 5/06* | (2006.01) | |
| *G01C 11/06* | (2006.01) | |
| *G05D 1/04* | (2006.01) | |
| *G05D 1/10* | (2006.01) | |

(52) U.S. Cl.
CPC ............ *B64C 39/024* (2013.01); *G01C 5/06* (2013.01); *G01C 11/06* (2013.01); *G05D 1/042* (2013.01); *G05D 1/101* (2013.01); *B64C 2201/027* (2013.01); *B64C 2201/146* (2013.01)

(58) Field of Classification Search
CPC ............ B64C 39/024; B64C 2201/027; B64C 2201/146; H04N 13/239; H04N 13/289; H04N 2013/0081; G06T 7/55; G06T 7/00; G06T 2207/10032; G05D 1/101; G05D 1/042; G01C 11/06; G01C 5/06; G01C 3/14

See application file for complete search history.

(56) References Cited

U.S. PATENT DOCUMENTS

| | | |
|---|---|---|
| 7,852,461 B2 | 12/2010 | Yahav |
| 8,948,935 B1 | 2/2015 | Peeters et al. |
| 2009/0073419 A1 | 3/2009 | Gesner et al. |
| 2009/0128833 A1 | 5/2009 | Yahav |
| 2015/0100182 A1 | 4/2015 | Zhu |

(Continued)

FOREIGN PATENT DOCUMENTS

| | | |
|---|---|---|
| CN | 101273280 A | 9/2008 |
| CN | 101504287 A | 8/2009 |
| CN | 101807080 A | 8/2010 |

(Continued)

OTHER PUBLICATIONS

Machine Translation of CN 101504287 retrieved from Espacenet dated May 13, 2019 (Year: 2019).*

(Continued)

*Primary Examiner* — Thomas Ingram
(74) *Attorney, Agent, or Firm* — Anova Law Group, PLLC

(57) ABSTRACT

A method for selecting an operation mode of a mobile platform includes detecting a height grade of the mobile platform and selecting an operation mode of the mobile platform according to a result of the detecting.

16 Claims, 15 Drawing Sheets

(56) References Cited

U.S. PATENT DOCUMENTS

2018/0072422 A1* 3/2018 Shannon ............... G05D 1/0858
2018/0237140 A1* 8/2018 Li ........................... G08C 17/02

FOREIGN PATENT DOCUMENTS

| CN | 103278139 A | 9/2013 |
| CN | 104238580 A | 12/2014 |
| CN | 104635743 A | 5/2015 |
| EP | 2550559 A1 | 1/2013 |
| EP | 3108653 A1 | 12/2016 |
| JP | 2004017743 A | 1/2004 |
| JP | 2006264573 A | 10/2006 |
| JP | 2008304260 A | 12/2008 |
| JP | 2010208501 A | 9/2010 |
| JP | 2013139256 A | 7/2013 |
| JP | 2014062789 A | 4/2014 |
| JP | 2015101198 A | 6/2015 |
| WO | 2013094526 A1 | 6/2013 |

OTHER PUBLICATIONS

Machine Translation of CN 104635743 retrieved from Espacenet dated May 13, 2019 (Year: 2019).*
Kim Jin Hyo et al., Multi-UAV-based stereo vision system without GPS for ground obstacle mapping to assist path planning of UGV, Electronics Letters, vol. 50, No. 20, Sep. 25, 2014, pp. 1431-1432.
Brockers Roland et al., Towards autonomous navigation of miniature UAV, 2014 IEEE Conference on Computer Vision and Pattern Recognition Workshops, IEEE, Jun. 23, 2014, pp. 645-651.
The World Intellectual Property Organization (WIPO) International Search Report and Written Opinion for PCT/CN2015/082524 dated Mar. 28, 2016 8 Pages.

* cited by examiner

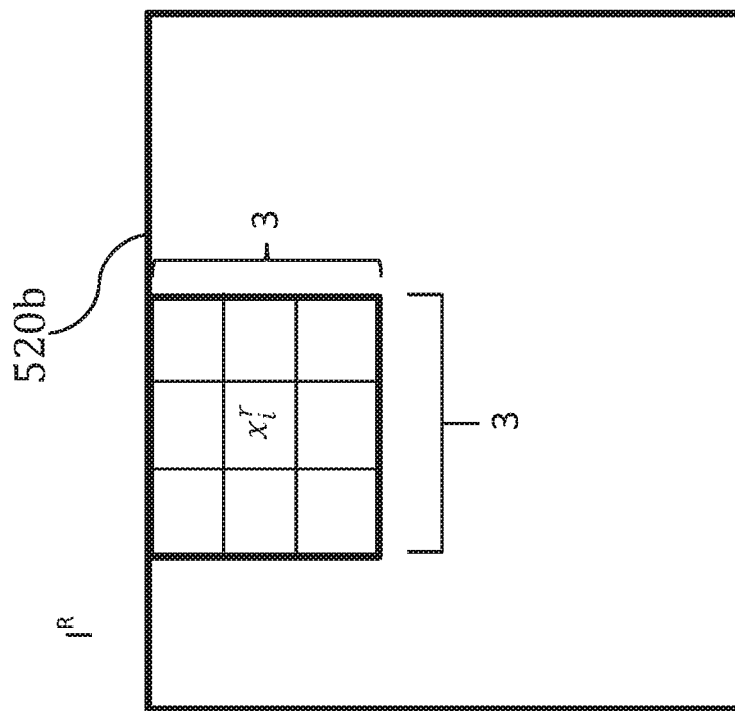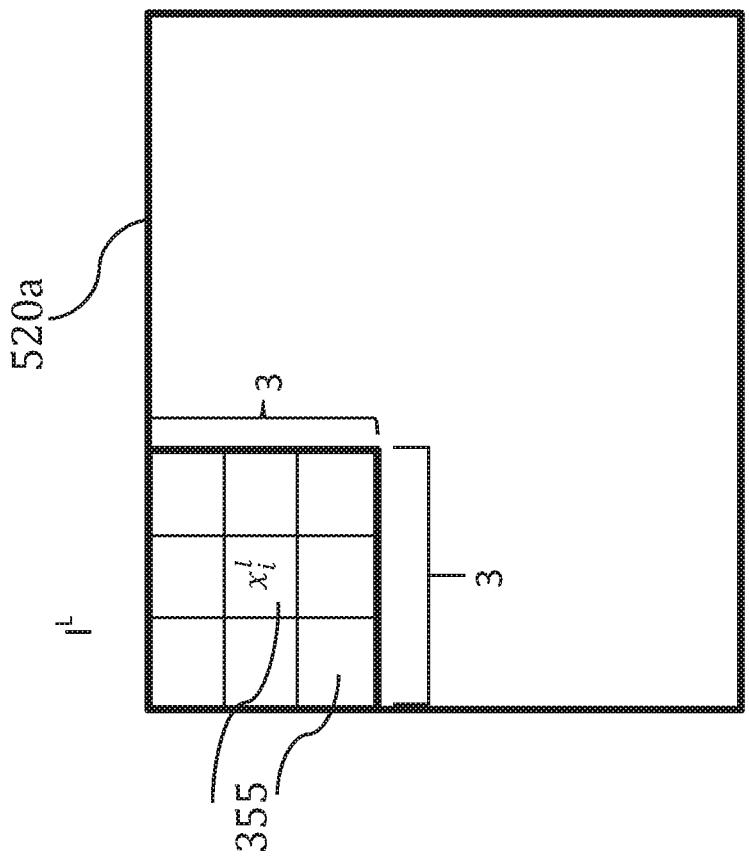
Fig. 10

SYSTEM AND METHOD FOR SELECTING AN OPERATION MODE OF A MOBILE PLATFORM

CROSS-REFERENCE TO RELATED APPLICATION

This application is a continuation application of International Application No. PCT/CN2015/082524, filed on Jun. 26, 2015, the entire contents of which are incorporated herein by reference.

FIELD

The disclosed embodiments relate generally to mobile platform operations and more particularly, but not exclusively, to systems and methods for operating a mobile platform within a wide range of heights.

BACKGROUND

Unmanned Aerial Vehicles ("UAVs") are commonly navigated and otherwise operated via vision technology. However, performance and precision of the vision technology are limited and can vary in accordance with height of the UAV.

Currently-available vision technology can only ensure its performance and precision within a certain height range. At lower or higher heights, the precision for operating the mobile platform is limited and cannot be ensured because of inherent shortcomings of the vision technology.

In view of the foregoing reasons, there is a need for a system and method for effectively operating the mobile platform in a wide range of heights.

SUMMARY

In accordance with a first aspect disclosed herein, there is set forth a method for selecting an operation mode of a mobile platform, comprising:

detecting a height grade of the mobile platform; and selecting an operation mode of the mobile platform according to a result of the detecting.

In an exemplary embodiment of the disclosed methods, detecting the height grade comprises determining a height of the mobile platform and/or a disparity between first and second images of a remote object from the perspective of the mobile platform.

In another exemplary embodiment of the disclosed methods, determining comprises obtaining the height via a barometer, an ultrasonic detector and/or a Global Positioning System ("GPS").

In another exemplary embodiment of the disclosed methods, determining comprises acquiring the disparity between the first and second images of the object as captured by a binocular imaging system associated with the mobile platform.

Exemplary embodiments of the disclosed methods further comprise categorizing the operation modes based on values of the height and/or disparity.

Exemplary embodiments of the disclosed methods further comprise initiating the mobile platform to operate at a first height mode.

In an exemplary embodiment of the disclosed methods, the first height mode comprises a very low altitude monocular mode.

Exemplary embodiments of the disclosed methods further comprise providing a distance sensor of the moving platform to assist the very low altitude monocular mode.

In an exemplary embodiment of the disclosed methods, selecting the operation mode comprises switching the operation mode based on the height grade, and wherein the height grade is determined based on at least one of the determined height and the determined disparity.

In another exemplary embodiment of the disclosed methods, selecting the operation mode comprises switching the mobile platform to a second height mode when the height is greater than a first height threshold.

In another exemplary embodiment of the disclosed methods, selecting the operation mode comprises switching the mobile platform to a second height mode when the disparity is less than a first disparity threshold.

In another exemplary embodiment of the disclosed methods, selecting the operation mode comprises switching the mobile platform to a second height mode when the height is greater than a first height threshold and the disparity is less than the first disparity threshold.

In another exemplary embodiment of the disclosed methods, switching the mobile platform to a second height mode comprises selecting a stereo vision mode with a first resolution.

In another exemplary embodiment of the disclosed methods, selecting the operation mode comprises switching the mobile platform to a third height mode when the disparity is less than or equal to a third disparity threshold.

In another exemplary embodiment of the disclosed methods, switching the mobile platform to a third height mode comprises switching a binocular imaging device to a stereo vision mode with an enhanced resolution.

In another exemplary embodiment of the disclosed methods, selecting the operation mode comprises switching the mobile platform to a fourth height mode when the height is greater than a third height threshold.

In another exemplary embodiment of the disclosed methods, selecting the operation mode comprises switching the mobile platform to a fourth height mode when the height is greater than a third height threshold and the disparity is less than the fifth disparity threshold.

In another exemplary embodiment of the disclosed methods, switching the mobile platform to a fourth height mode comprises switching the binocular imaging device to a high altitude monocular mode in combination with a barometer, a GPS and/or a visual measurement of a vertical distance between the mobile platform and a ground level.

In another exemplary embodiment of the disclosed methods, selecting the operation mode comprises switching the mobile platform to the third height mode when the height is less than a fourth height threshold.

In another exemplary embodiment of the disclosed methods, selecting the operation mode comprises switching the mobile platform to the third height mode when the height is less than a fourth height threshold and the disparity is greater than a sixth disparity threshold.

In another exemplary embodiment of the disclosed methods, selecting the operation mode comprises switching the mobile platform to the second height mode when the disparity is greater than a fourth disparity threshold.

In another exemplary embodiment of the disclosed methods, selecting the operation mode comprises switching the mobile platform to the first height mode when the height is less than a second height threshold.

In another exemplary embodiment of the disclosed methods, selecting the operation mode comprises switching the mobile platform to the first height mode when the height is less than a second height threshold and the disparity is greater than a second disparity threshold.

In another exemplary embodiment of the disclosed methods, the second disparity threshold is greater than the first disparity threshold;

at least one of the first and second disparity thresholds is greater than at least one of the third and fourth disparity thresholds;

the third disparity threshold is greater than the fourth disparity threshold;

at least one of the third and fourth disparity thresholds is greater than at least one of the fifth and sixth disparity thresholds; and the sixth disparity threshold is greater than the fifth threshold.

In another exemplary embodiment of the disclosed methods, the first height threshold is greater than the second height threshold;

at least one of the third and fourth height thresholds is greater than at least one of the first and second height thresholds; and the third height threshold is greater than the fourth threshold.

In another exemplary embodiment of the disclosed methods, determining the disparity of the first and second images comprises:

selecting a plurality of feature points from the first image; and matching the feature points of the first image with points of the second image.

In another exemplary embodiment of the disclosed methods, the feature points comprise pixels of either the first image or the second image.

In another exemplary embodiment of the disclosed methods, matching the plurality of feature points comprises:

scanning the second image to identify a point of the second image that matches a selected feature point of the first image; and calculating a similarity between the selected feature point of the first image and the point of the second image.

In another exemplary embodiment of the disclosed methods, calculating the similarity comprises:

building a first binary string representing a first region around the selected feature point by comparing intensities of each point pairs of the region to generate a first Binary Robust Independent Elementary Features ("BRIEF") descriptor;

building a second binary string representing a second region around the point of the second image by comparing intensities of each point pairs of the second region to generate a second BRIEF descriptor; and determining the point of the second image matches the selected feature point when a hamming distance between the first BRIEF descriptor and the second BRIEF descriptor is less than a first hamming threshold.

In another exemplary embodiment of the disclosed methods, calculating the similarity comprises comparing the selected feature point of the first image with a three-by-three pixel area centered around the point on the second image.

In another exemplary embodiment of the disclosed methods, comparing comprises comparing a sum of differences for each color component of each pixel of color images or a sum of differences of grayscale values of each pixel of black and white images.

In another exemplary embodiment of the disclosed methods, determining the disparity comprises acquiring the disparity based on an average of the disparities of the feature points.

In another exemplary embodiment of the disclosed methods, determining the disparity comprises selecting one or more feature points and acquiring the disparity based on the disparities of the selected feature points.

In accordance with another aspect disclosed herein, there is set forth a system for selecting an operation mode of a mobile platform configured to perform the detection process in accordance with any one of previous embodiments of the disclosed methods.

In accordance with another aspect disclosed herein, there is set forth a computer program product comprising instructions for selecting an operation mode of a mobile platform configured to perform the detection process in accordance with any one of previous embodiments of the disclosed methods.

In accordance with another aspect disclosed herein, there is set forth an apparatus for selecting an operation mode of a mobile platform, comprising:

a binocular imaging device associated with the mobile platform; and a processor configured for:

detecting a height grade of the mobile platform; and selecting an operation mode of the mobile platform according to a result of the detecting.

In an exemplary embodiment of the disclosed apparatuses, the processor is configured to determine a height of the mobile platform and/or a disparity between first and second images of a remote object from the perspective of the mobile platform.

Exemplary embodiments of the disclosed apparatuses further comprise a barometer associated with the mobile platform for obtaining the height of the mobile platform.

Exemplary embodiments of the disclosed apparatuses further comprise an ultrasonic detector associated with the mobile platform for obtaining the height of the mobile platform.

Exemplary embodiments of the disclosed apparatuses further comprise a GPS associated with the mobile platform for obtaining the height and/or location of the mobile platform.

In an exemplary embodiment of the disclosed apparatuses, the processor is configured to acquire the disparity between the first and second images of the object as captured by a binocular imaging system associated with the mobile platform.

In an exemplary embodiment of the disclosed apparatuses, the operation modes of the mobile platform are categorized based on height values and/or the disparity values.

In an exemplary embodiment of the disclosed apparatuses, the processor is configured to initialize the mobile platform to operate at a first height mode.

In an exemplary embodiment of the disclosed apparatuses, the first height mode comprises a very low altitude monocular mode.

In an exemplary embodiment of the disclosed apparatuses, a distance sensor of the moving platform is provided to assist the very low altitude monocular mode.

In another exemplary embodiment of the disclosed apparatuses, the processor is configured to switch the operation mode based on the height grade, and wherein the height grade is determined based on at least one of the determined height and the determined disparity.

In another exemplary embodiment of the disclosed apparatuses, the processor is configured to switch to a second height mode when the height is greater than a first height threshold.

In another exemplary embodiment of the disclosed apparatuses, the processor is configured to switch to a second height mode when the disparity is less than a first disparity threshold.

In another exemplary embodiment of the disclosed apparatuses, the processor is configured to switch to a second height mode when the height is greater than a first height threshold and the disparity is less than the first disparity threshold.

In another exemplary embodiment of the disclosed apparatuses, the second height mode comprises a stereo vision mode with a first resolution.

In another exemplary embodiment of the disclosed apparatuses, the processor is configured to switch to a third height mode when the disparity is less than or equal to a third disparity threshold.

In another exemplary embodiment of the disclosed apparatuses, the third height mode is a stereo vision mode with an enhanced resolution.

In another exemplary embodiment of the disclosed apparatuses, the processor is configured to switch to a fourth height mode when the height is greater than a third height threshold.

In another exemplary embodiment of the disclosed apparatuses, the processor is configured to switch to a fourth height mode when the height is greater than a third height threshold and the disparity is less than the fifth disparity threshold.

In another exemplary embodiment of the disclosed apparatuses, the fourth height mode comprises is a high altitude monocular mode in combination with a barometer, a GPS and/or a visual measurement of a vertical distance between the mobile platform and a ground level.

In another exemplary embodiment of the disclosed apparatuses, the processor is configured to switch to the third height mode when the height is less than a fourth height threshold.

In another exemplary embodiment of the disclosed apparatuses, the processor is configured to switch to the third height mode when the height is less than a fourth height threshold and the disparity is greater than a sixth disparity threshold.

In another exemplary embodiment of the disclosed apparatuses, the processor is configured to switch to the second height mode when the disparity is greater than a fourth disparity threshold.

In another exemplary embodiment of the disclosed apparatuses, the processor is configured to switch the first height mode when the height is less than a second height threshold.

In another exemplary embodiment of the disclosed apparatuses, the processor is configured to switch the first height mode when the height is less than a second height threshold and the disparity is greater than a second disparity threshold.

In another exemplary embodiment of the disclosed apparatuses, the second disparity threshold is greater than the first disparity threshold;

one or both of the first and second disparity thresholds are greater than one or both of the third and fourth disparity thresholds;

the third disparity threshold is greater than the fourth disparity threshold;

one or both of the third and fourth disparity thresholds are greater than one or both of the fifth and sixth disparity thresholds; and the sixth disparity threshold is greater than the fifth threshold.

In another exemplary embodiment of the disclosed apparatuses, the first height threshold is greater than the second height threshold;

any one of the third and fourth height thresholds is greater than the first and second height thresholds; and the third height threshold is greater than the fourth threshold.

In another exemplary embodiment of the disclosed apparatuses, the processor is configured to determine the height of an Unmanned Aerial Vehicle ("UAV") and the disparity from the perspective of the UAV, and wherein the processor is configured to select an operation mode of the UAV according to the determining.

In another exemplary embodiment of the disclosed apparatuses, the processor is configured to select a plurality of feature points on the first image and to match the plurality of feature points of the first image with points of the second image.

In another exemplary embodiment of the disclosed apparatuses, the feature points comprise pixels of either the first image or the second image.

In another exemplary embodiment of the disclosed apparatuses, the disparity is at least five pixels and no more than one fifth of a width of the first image or the second image.

In another exemplary embodiment of the disclosed apparatuses, the processor is configured to scan the second image to identify a point of the second image that matches a selected feature point of the first image and to calculate a similarity between the selected feature point of the first image and the point.

In another exemplary embodiment of the disclosed apparatuses, the processor is configured for:

building a first binary string representing a first region around the selected feature point by comparing intensities of each point pairs of the region to generate a first Binary Robust Independent Elementary Features ("BRIEF") descriptor;

building a second binary string representing a second region around the point of the second image by comparing intensities of each point pairs of the second region to generate a second BRIEF descriptor; and determining the point of the second image matches the selected feature point when a hamming distance between the first BRIEF descriptor and the second BRIEF descriptor is less than a first hamming threshold.

In another exemplary embodiment of the disclosed apparatuses, the similarity is calculated by comparing the selected feature point of the first image with a three-by-three pixel area centered around the point on the second image.

In another exemplary embodiment of the disclosed apparatuses, the three-by-three pixel area is compared by a sum of differences for each color component of each pixel of color images or a sum of differences of grayscale values of each pixel of black and white images.

In another exemplary embodiment of the disclosed apparatuses, the disparity is determined based on an average of the feature disparities.

In another exemplary embodiment of the disclosed apparatuses, the processor is configured to select one or more feature points and to acquire the disparity based on the features disparities of the selected feature points.

In accordance with another aspect disclosed herein, there is set forth a method for determining an operation mode of a mobile platform, comprising:

detecting a height grade of the mobile platform;

selecting one or more sensors based on a result of the detecting; and obtaining measurements from the selected sensors, wherein the height grade is selected from a group of four height grades.

In another exemplary embodiment of the disclosed methods, selecting the one or more sensors comprises selecting one image sensor at a first height grade.

In another exemplary embodiment of the disclosed methods, selecting the one or more sensors comprises selecting one image sensor and a distance sensor at a first height grade.

In another exemplary embodiment of the disclosed methods, the distance sensor comprises an ultrasonic detector and/or a laser detection device.

In another exemplary embodiment of the disclosed methods, selecting the one or more sensors further comprises selecting at least two image sensors at a second height grade, wherein the at least two image sensors have a first resolution.

In another exemplary embodiment of the disclosed methods, selecting the one or more sensors further comprises selecting at least two image sensors with a second resolution at a third height grade, the second resolution being an enhanced resolution.

In another exemplary embodiment of the disclosed methods, the second resolution is greater than the first resolution.

In another exemplary embodiment of the disclosed methods, selecting the one or more sensors further comprises selecting one image sensor and one height sensor at a fourth height grade.

In another exemplary embodiment of the disclosed methods, the height sensor comprises a barometer and/or a Global Positioning System ("GPS").

In accordance with another aspect disclosed herein, there is set forth a flying operation system of a mobile platform, comprising:

a height sensor for detecting a height grade of the mobile platform;

a processor configured to select one or more sensors based on the detected height grade and to obtain measurements from the selected sensors, wherein the height grade is selected from a group of four height grades.

In another exemplary embodiment of the disclosed systems, the processor is configured to select one image sensor at a first height grade.

In another exemplary embodiment of the disclosed systems, the processor is configured to select one image sensor and a distance sensor at a first height grade.

In another exemplary embodiment of the disclosed systems, the height sensor comprises a distance sensor, and wherein the distance sensor comprises an ultrasonic detector and/or a laser detection device.

In another exemplary embodiment of the disclosed systems, the processor is configured to select at least two image sensors at a second height grade, wherein the at least two image sensors have a first resolution.

In another exemplary embodiment of the disclosed systems, the processor is configured to select at least two image sensors with a second resolution at a third height grade, the second resolution being an enhanced resolution.

In another exemplary embodiment of the disclosed systems, the second resolution is greater than the first resolution.

In another exemplary embodiment of the disclosed systems, the processor is configured to select one image sensor and one height sensor at a fourth height grade.

In another exemplary embodiment of the disclosed systems, the height sensor comprises a barometer and/or a Global Positioning System ("GPS").

BRIEF DESCRIPTION OF THE DRAWINGS

FIG. 10 is an exemplary diagram of another embodiment of the method of FIG. 9, illustrating an exemplary method for matching two images with an overlapping area.

Figure 1:
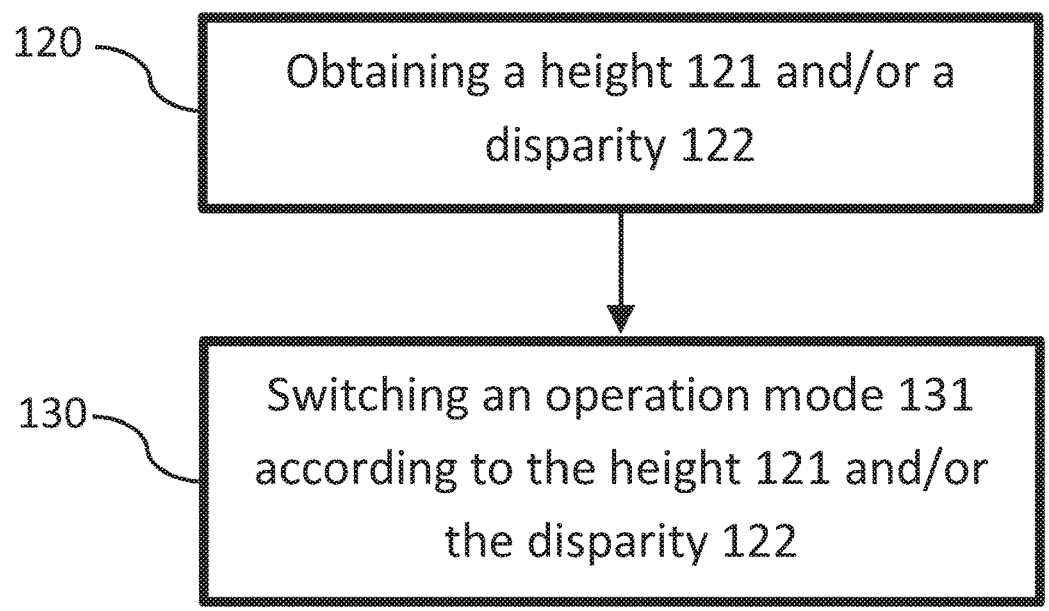
FIG. 1 an exemplary top-level flowchart, illustrating an embodiment of a method for selecting an operation mode in a wide range of heights.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Navigation of Unmanned Aerial Vehicles ("UAVs") commonly is performed by using stereo vision technology for operating the UAVs. However, the precision of stereo vision technology is limited and can vary in accordance with height.

Stereo vision systems typically perform navigation by considering an overlapping area of a scene as viewed by each of two lenses of the stereo vision system. A baseline length between the lenses of conventional stereo vision systems typically is between four centimeters and twenty centimeters. The applicable height range of the stereo vision technology, however, is restricted by the baseline length. In other words, the range of measurable height is limited by the baseline length.

The overlapping area of the scene is relied on to operate the UAV. At low altitude, for example, a distance between the lenses of the binocular imaging system and the ground is too short to form a usable overlapping area between each scene viewed by the lenses of the binocular imaging device. Whereas, at very high altitude, a distance between the lenses of the stereo vision system and the ground is too long. In such case, the long distance generates a short baseline between the two lenses of the stereo vision system, resulting inaccurate calculation results.

Since currently-available stereo vision navigation systems are restricted by baseline lengths, a mobile system and method that can meet the requirements of operating the UAV at various heights by switching among operation modes based on a height of the mobile system and a disparity can prove desirable and provide a basis for accurate measurement of depth, for systems such as UAV systems and other mobile systems. This result can be achieved, according to one embodiment disclosed in FIG. 1.

Referring now to FIG. 1, an exemplary embodiment of a method 100 for selecting an operation mode of a mobile platform 200 (shown in FIG. 2) in a wide range of heights. In FIG. 1, at 120, a height 121 and/or a disparity 122 can be detected as bases for determining an operation mode for the mobile platform 200. The height 121 and/or the disparity 122 can represent a height grade. In some embodiments, such detection can be conducted in real-time and/or in a time-delayed manner. The height 121 is associated with an elevation information, such as flying height, or altitude, of the mobile platform 200. The disparity 122 represents a difference in image location of an object depicted in two images or frames. The disparity 122 can be decided statically and/or dynamically in the manner shown and described below with reference to FIGS. 9-12. The mobile platform 200 can comprise any form of aerial vehicle that can have an elevation while such mobile platform 200 is in operation. The height 121 can be determined in the manner shown and described below with reference to FIG. 6.

At 130, the mobile platform 200 can use the acquired height grade, i.e. the height 121 and/or the disparity 122, to select or switch among several predetermined operation modes 131. The operation modes 131 can comprise operations involving various devices associated with the mobile platform 200, which can be included at any time. Such devices are shown and described below with reference to FIGS. 6 and 7. The selection or switching of operation modes 131 will be shown and described in detail with reference to FIG. 8.

Although shown and described as using the height 121 and/or the disparity 122 as the criteria for selecting or switching operation modes for illustrative purposes only, other suitable condition data can be used for the criteria of selecting or switching among operation modes.

Figure 2:
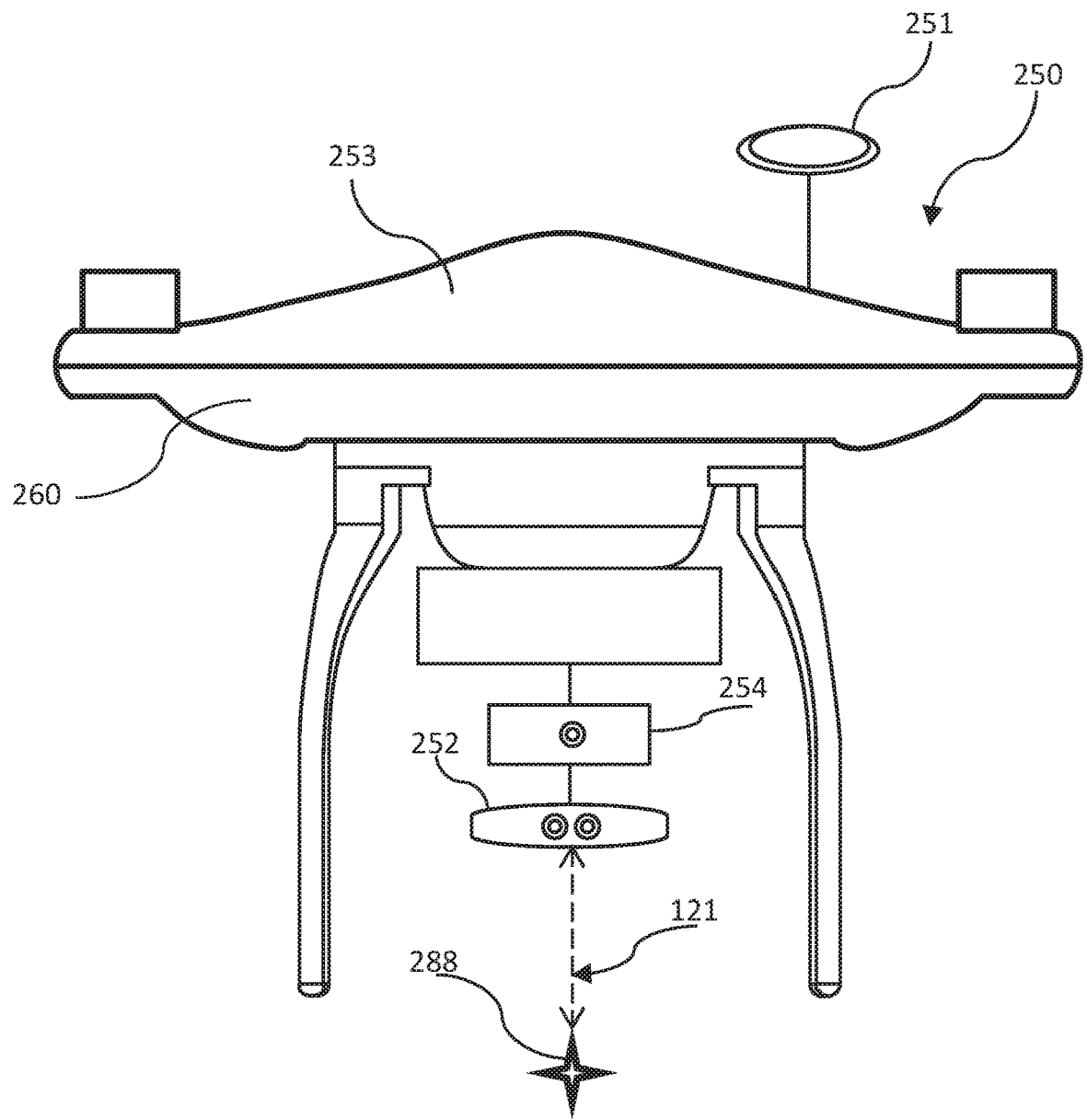
FIG. 2 is an exemplary schematic diagram, illustrating a mobile platform equipped with devices to realize the method of FIG. 1, wherein such devices include a barometer, a GPS, an ultrasonic detector and a stereo vision system.

FIG. 2 shows a mobile platform 200 with devices 251-254 for detecting conditions that can be bases to realize the method 100 by switching operation modes 131. In FIG. 2, the devices 251-254 can include at least a barometer 251, one or more ultrasonic detectors 252, a GPS 253 and a binocular imaging device 254. Among the devices 251-254, the barometer 251, the ultrasonic detector 252 and/or the GPS 253 can be used to detect the height 121 (or altitude) of the mobile platform 200, and the binocular imaging device 254 can be an information source of the disparity 122. In FIG. 2, the ultrasonic detector 252 can be used to detect a distance to an object 288 that can be the ground. Therefore, the distance between the ultrasonic detector 252 and the object 288 can represent a vertical height 121 of the mobile platform 200 relative to the ground level.

In FIG. 2, the barometer 251 can be installed on top of a body 260 of the mobile platform 200. The ultrasonic detectors 252 can be arranged around a lower part of the body 260. The GPS 253 can be installed in the body 260 of the mobile platform 200. The binocular imaging device 254 can be arranged under the body 260. However, under this disclosure, the barometer 251 and the GPS 253 can be disposed on any part of the mobile platform 200, such as inside the body 260, under the body 260 or any side of the body 260 etc. The ultrasonic detectors 252 can be disposed anywhere around the body 260. The binocular imaging device 254 can be disposed at any suitable position of the lower part of the body 260.

Although shown and described as using the devices 251-254 for purposes of illustrations only, any other suitable devices can also be used for detecting the conditions for determining the switching among the operation modes 131. The mobile platform 200 can comprise any conventional type of mobile platform that can have an elevation and is illustrated in FIG. 2 as comprising an unmanned aerial vehicle UAV 250 for purposes of illustration only and not for purposes of limitation.

Figure 3:
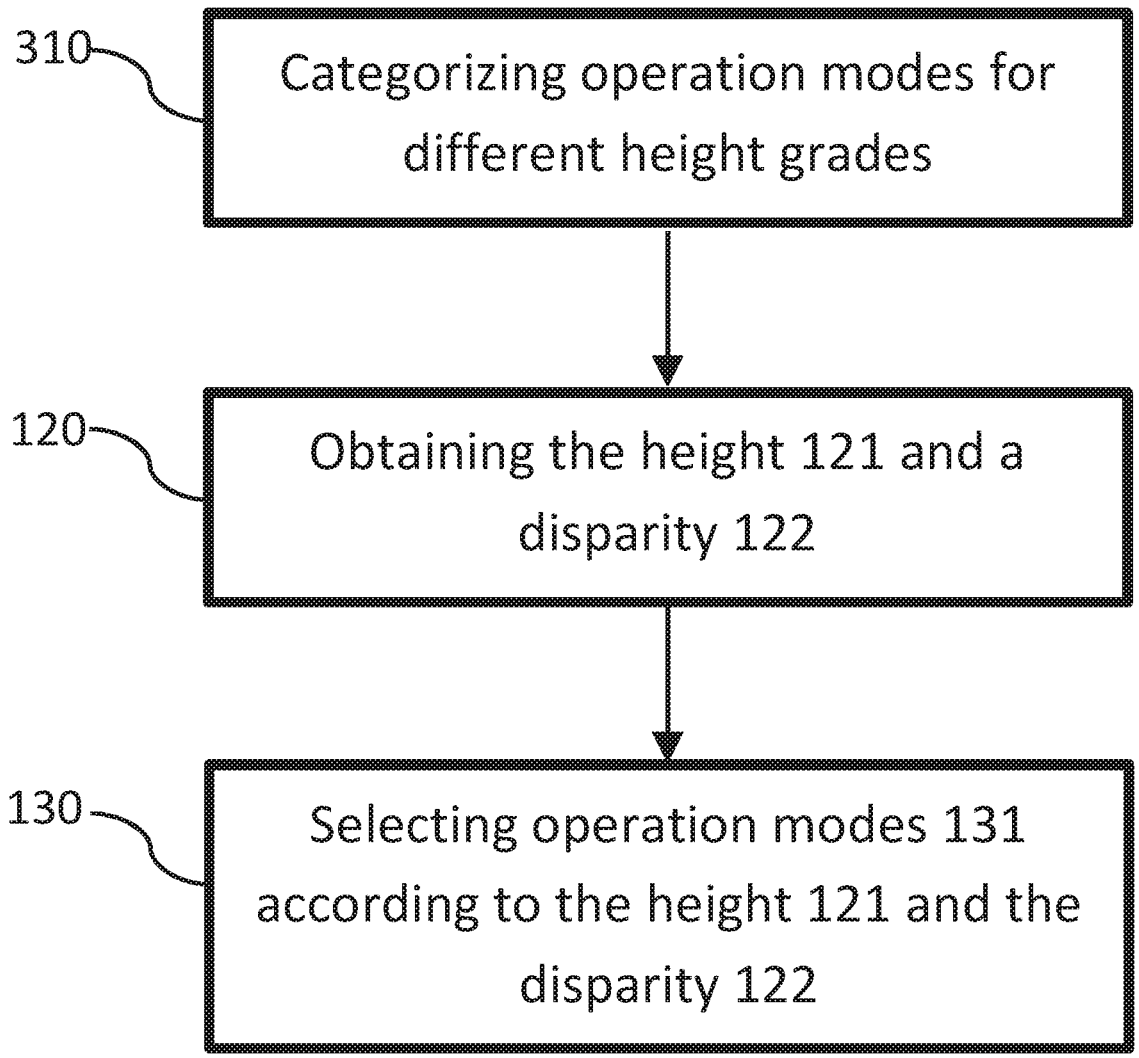
FIG. 3 is an exemplary flowchart of another embodiment of the method of FIG. 1, wherein the method includes categorizing operation modes for different heights.

FIG. 3 shows another exemplary embodiment of the method 100 for selecting an operation mode in a wide range of heights. In FIG. 3, the method 100 can comprise a procedure of categorizing operation modes, at 310. The operation modes can be categorized, for example, based upon different height grades, i.e. height range and/or disparity values. As discussed above, currently-available single mode operations cannot meet requirements of different heights, for example, a binocular system using stereo vision technology cannot satisfy requirements for a high altitude/height and a very low altitude/height. On the other hand, other available operation modes of a mobile platform 200 can be more suitable for the high altitude/height or the low altitude/height.

At different heights or altitudes, a variation of operation modes can be used to operate the mobile platform 200. For the purposes of operating the mobile platform 200 at all heights, the operation modes can be categorized according to several height grades. Additional detail of the categorization will be shown and described below with reference to FIG. 4.

Although described as categorizing the operation modes according to different height grades for purposes of illustrations only, the categorization under this disclosure can based on any other suitable information, such as based on a combination of the height 121 and the disparity 122.

Figure 4:
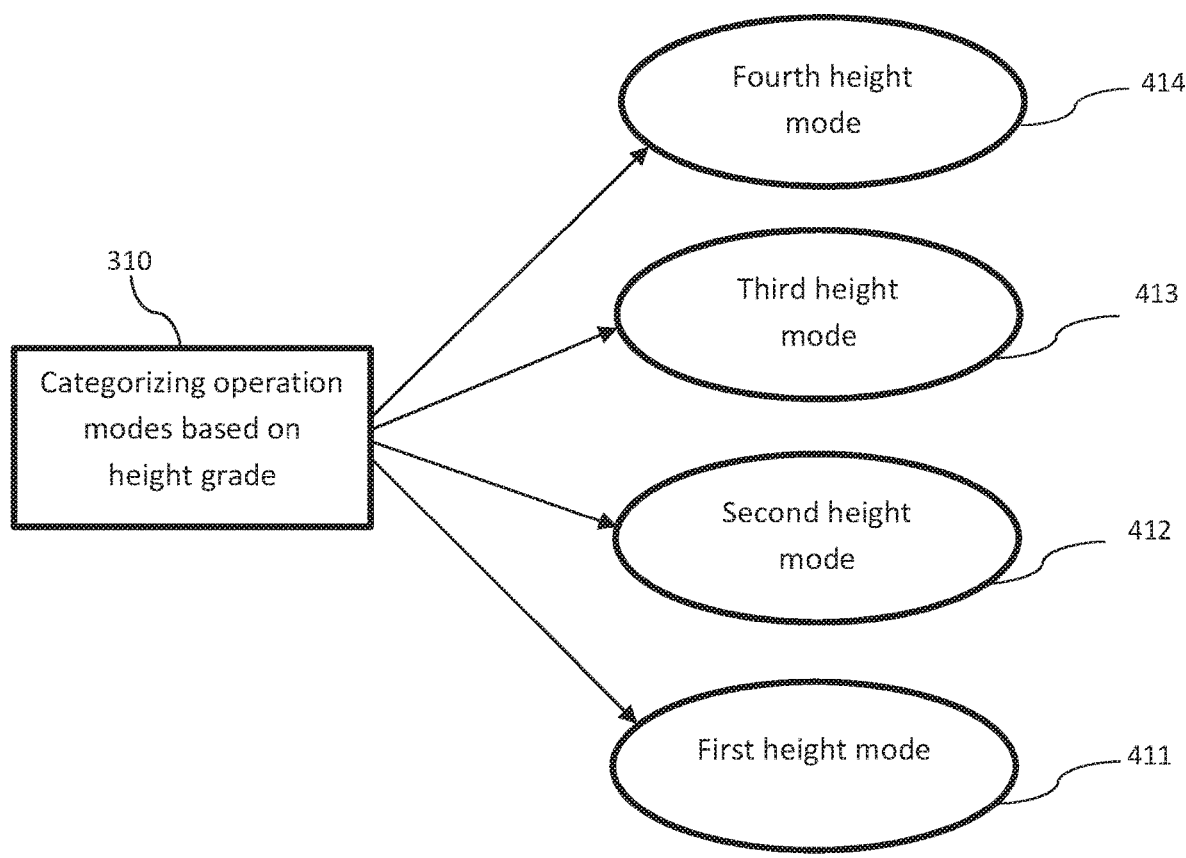
FIG. 4 is an exemplary block diagram of another embodiment of the method of FIG. 3, wherein the method categorizes four operation modes based on heights.

FIG. 4 shows an embodiment of the categorizing operation modes into four modes for the method 100. In FIG. 4, a first height mode 411, a second height mode 412, a third height mode 413, and a fourth height mode 414 can be provided in accordance with different height grades. The fourth height mode 414 is designed to be used with, for example, a fourth height range of twenty meters (20 m) and above. Under the fourth height mode 414, the mobile platform 200 (shown in FIG. 2) can work with a high-altitude monocular mode. Under the high-altitude monocular mode, in order to determine the height 121, a depth of an object can be determined, for example, with a combination of a barometer 251, a GPS 253 and/or vision detection. An operation mode of the mobile platform 200 can be determined based on the height information.

The third height mode 413 is designed to be used with, for example, a third height range of three and half meters (3.5 m) to twenty meters (20 m). Within the third height range, a binocular device with a normal resolution of three hundred and twenty by two hundred and forty (320×240) cannot meet the requirements of detecting the depth and selecting an operation mode of the mobile platform 200. To deal with the issue, under the third height mode 413, an enhanced resolution binocular mode can be utilized to determine the height 121 and selecting an operation mode of the mobile platform 200. Under the enhanced resolution binocular mode, the resolution can be at least six hundred and fourth by four hundred and eighty (640×480).

The second height mode 412 is designed to be used with, for example, a second height range of fifty centimeters (50 cm) to three and a half meters (3.5 m). Within the second height range, the second height mode 412 can use a normal-resolution binocular mode, which can use a resolution of three hundred and twenty by two hundred and forty (320×240).

The first height mode 411 is designed to be used with, for example, a first height range of ten centimeters (10 cm) to fifty centimeters (50 cm). Within the first height range, there may not be enough overlapping between images acquired with two lenses for a binocular system because of a short distance between the lenses and an object of interest. Therefore, under the first height mode 411, a very low altitude monocular mode can be used; wherein, other distance sensors can be employed to detect a distance between an optical center of a lens and the ground level, i.e. the object depth, for selecting an operation mode of the mobile platform 200.

Although shown and described as categorizing operation modes into four categories for purposes of illustration only, any suitable number of categories can be utilized under the present disclosure. In addition to the height 121 to the ground, the present disclosure can use other conditions in categorizing and/or switching among the operation modes. Such conditions can comprise the disparity 122.

Figure 5:
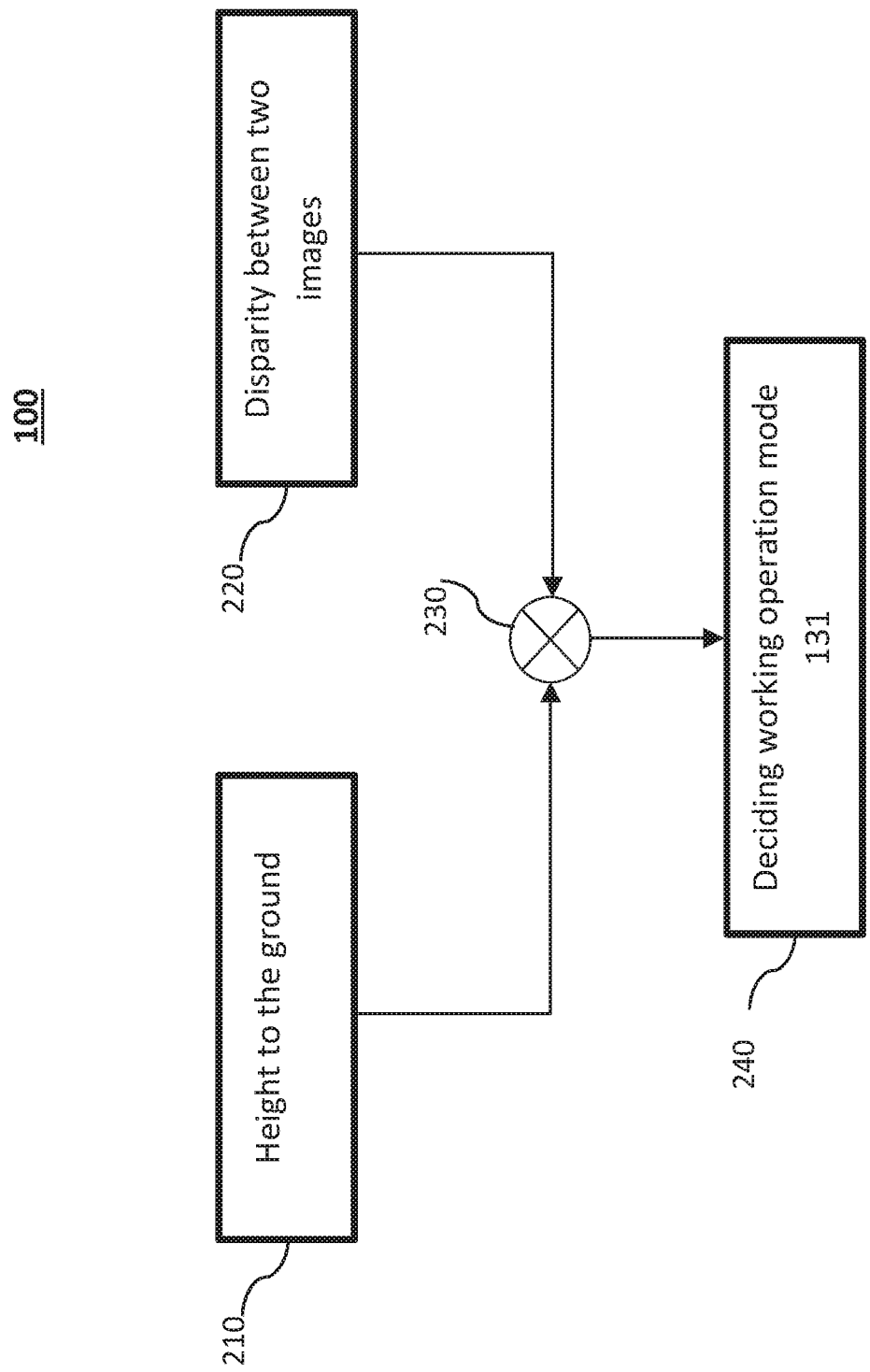
FIG. 5 is an exemplary block diagram of another embodiment of the method of FIG. 1, wherein the height and the disparity information is used to decide a working operation mode.

FIG. 5 shows another exemplary embodiment of the method 100, wherein a height 121 and/or a disparity 122 can be used for deciding an operation mode 131. The height 121 represents a vertical distance between the mobile platform 200 (shown in FIG. 2) and the ground level. The height 121 can be acquired via a barometer 251, an ultrasonic detector 252 and/or a GPS 253, in a manner shown and described below with reference to FIG. 6. As shown and described with reference to FIG. 1, the disparity 122 represents a difference in image location of an object in two images or frames. The disparity 122 can be determined in a manner shown and described below with reference to FIGS. 9-12.

At 230, the height 121 and the disparity 122 information can be combined. The combined information can be used in deciding the operation mode 131, at 240. Although shown and described as using the combined information to decide the operation mode 131, either the height 121 or and disparity 122 can be used separately in deciding the operation mode 131.

Figure 6:
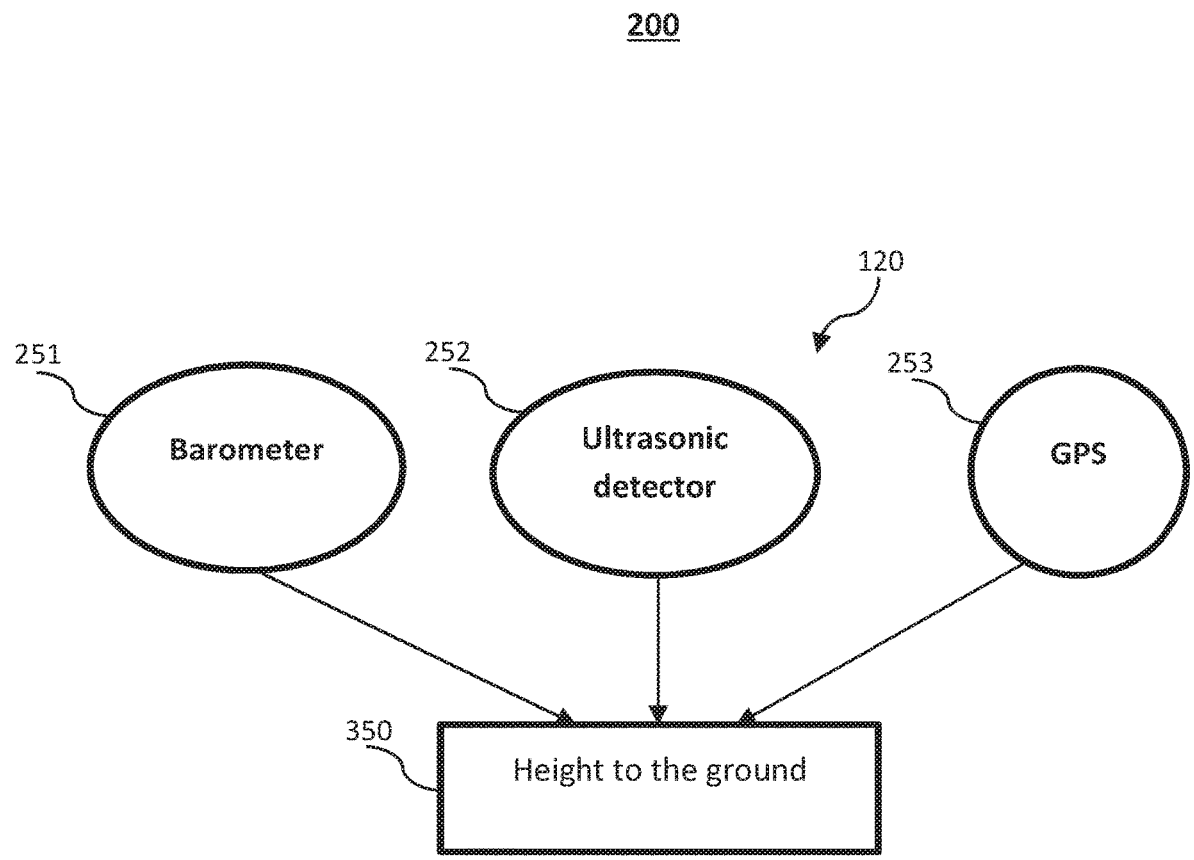
FIG. 6 is an exemplary block diagram of another embodiment of the mobile platform of FIG. 2, wherein the mobile platform uses the barometer, the ultrasonic detector and/or the GPS for obtaining the height information.

FIG. 6 shows an exemplary embodiment of the mobile platform 200 showing obtaining the height 121, at 120, in the method 100. In FIG. 6, a barometer 251, an ultrasonic detector 252 and/or a GPS 253 can be used to obtain the height 121 of the mobile platform 200 (collectively shown in FIG. 2). The barometer 251 can be any type of barometer or pressure altimeter, which is commercially available from the market, for determining the height 121 based on a measurement of atmospheric pressure. Such a barometer 251 can comprise a water-based barometer, a mercury barometer, a vacuum pump oil barometer, an aneroid barometer, a barograph or an MEMS barometer. The barometer 251 can also include other types of barometers, such as a storm barometer.

Additionally and/or alternatively, the ultrasonic detector 252 can be used to detect a distance 121 of an object 288 (shown in FIG. 2) in the surroundings by emitting ultrasonic waves and receiving ultrasonic waves reflected from the object 288. The distance 121 can be a distance to the ground level, where the object 288 is the ground. The ground level 880 can be the actual ground, a water level or the ground with any structure. Such ultrasonic detector 252 can comprise any commercially-available ultrasonic sensors. Although shown and described as using a single ultrasonic detector 252 for detecting the object 288 in one direction for purposes of illustration only, multiple ultrasonic detectors 252 can be provided for detecting an object 288 in multiple directions.

The GPS 253 is a space-based satellite navigation system that can provide a location, a height and/or time information anywhere on or near the earth where there is an unobstructed line of sight to four or more GPS satellites. The GPS 252 can comprise any GPS devices commercially available from the market. The location can be provided by the GPS 253 as longitude and latitude. The height can be a height in meters or feet to the ground level.

The height 121, applicable under this disclosure, can be any vertical distance in a range of twenty-five centimeters (25 cm) to over one hundred meters (100 m) to the ground level. As shown and described with reference to FIG. 4, the height 121 can be categorized into a first height, a second height, a third height, and a fourth height under this disclosure. Although shown and described as using a barometer 251, an ultrasonic detector 252 or a GPS 253 for detecting the height 121 for purposes of illustration only, other suitable detecting devices can be used for detecting the height 121 of the mobile platform 200.

Figure 7:
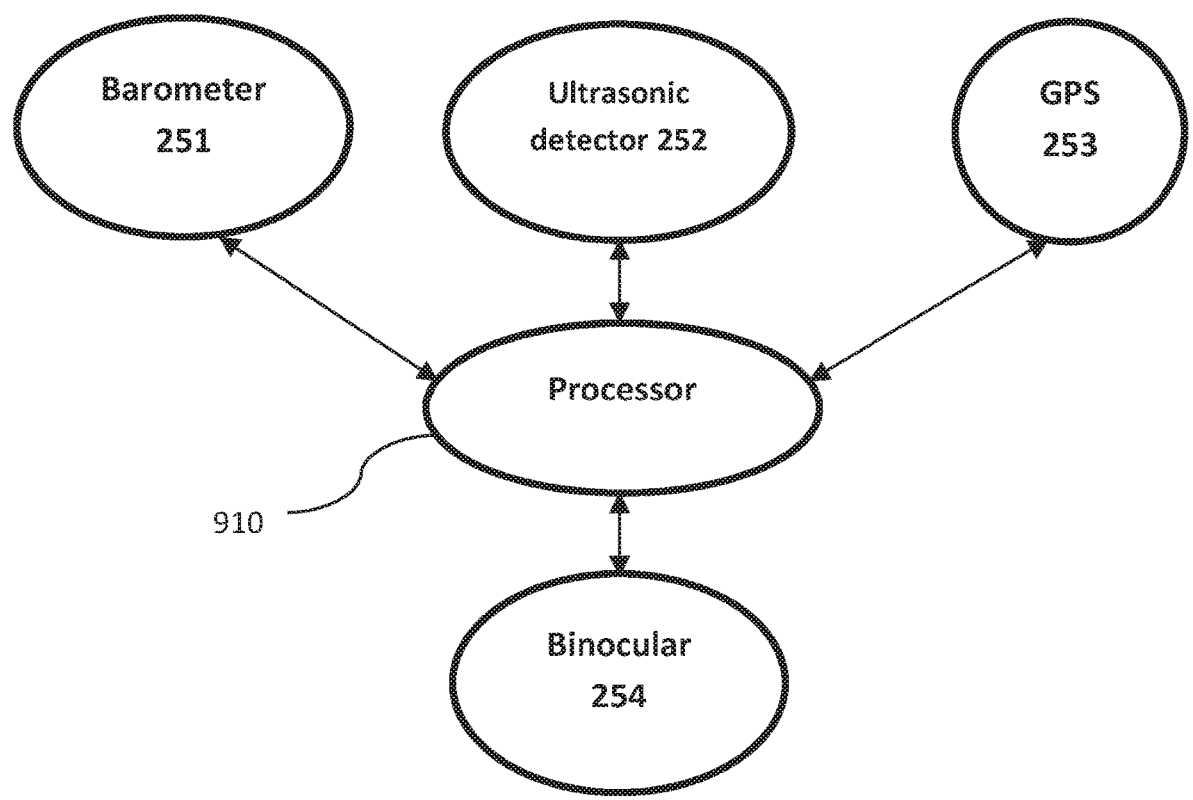
FIG. 7 is an exemplary top-level diagram, illustrating another embodiment of the mobile platform of FIG. 2, wherein a processor collects condition data and controls the operation modes.

FIG. 7 illustrates another exemplary embodiment of the mobile platform 200 of FIG. 2. In FIG. 7, a processor 910 can be connected with the barometer 251, the ultrasonic detector 252, the GPS 253 and the binocular imaging device 254 to collect condition data and controls the operation modes for implementing the method 100. The processor 910 can be a processor associated with the mobile platform for controlling the mobile platform 200. The binocular imaging device 254 can be an imaging device with binocular lenses that can be used to capture two images of an object simultaneously.

In some embodiments of the mobile platform 200, the processor 910 can be provided for obtaining and processing the information obtained from the barometer 251, the ultrasonic detector 252, the GPS 253 and/or the binocular device 254. Such information includes the height 121 and the disparity 122 (collectively shown in FIG. 1). The processor 910 can determine which operation mode 131 can be selected based on the information. Additional detail of determining the operation mode 131 will be shown and described below with reference to FIG. 8.

The processor 910 can comprise any commercially available processing chip or be any custom-designed processing chips specially produced for the apparatus 900 for selecting an operation mode of the mobile platform 200. Additionally and/or alternatively, the processor 910 can include one or more general purpose microprocessors (for example, single or multi-core processors), application-specific integrated circuits, application-specific instruction-set processors, data processing units, physics processing units, digital signal processing units, coprocessors, network processing units, audio processing units, encryption processing units, and the like. The processor 910 can be configured to perform any of the methods described herein, including but not limited to, a variety of operations relating to operation mode selection. In some embodiments, the processor 910 can include specialized hardware for processing specific operations relating to operation mode selection.

Figure 8:
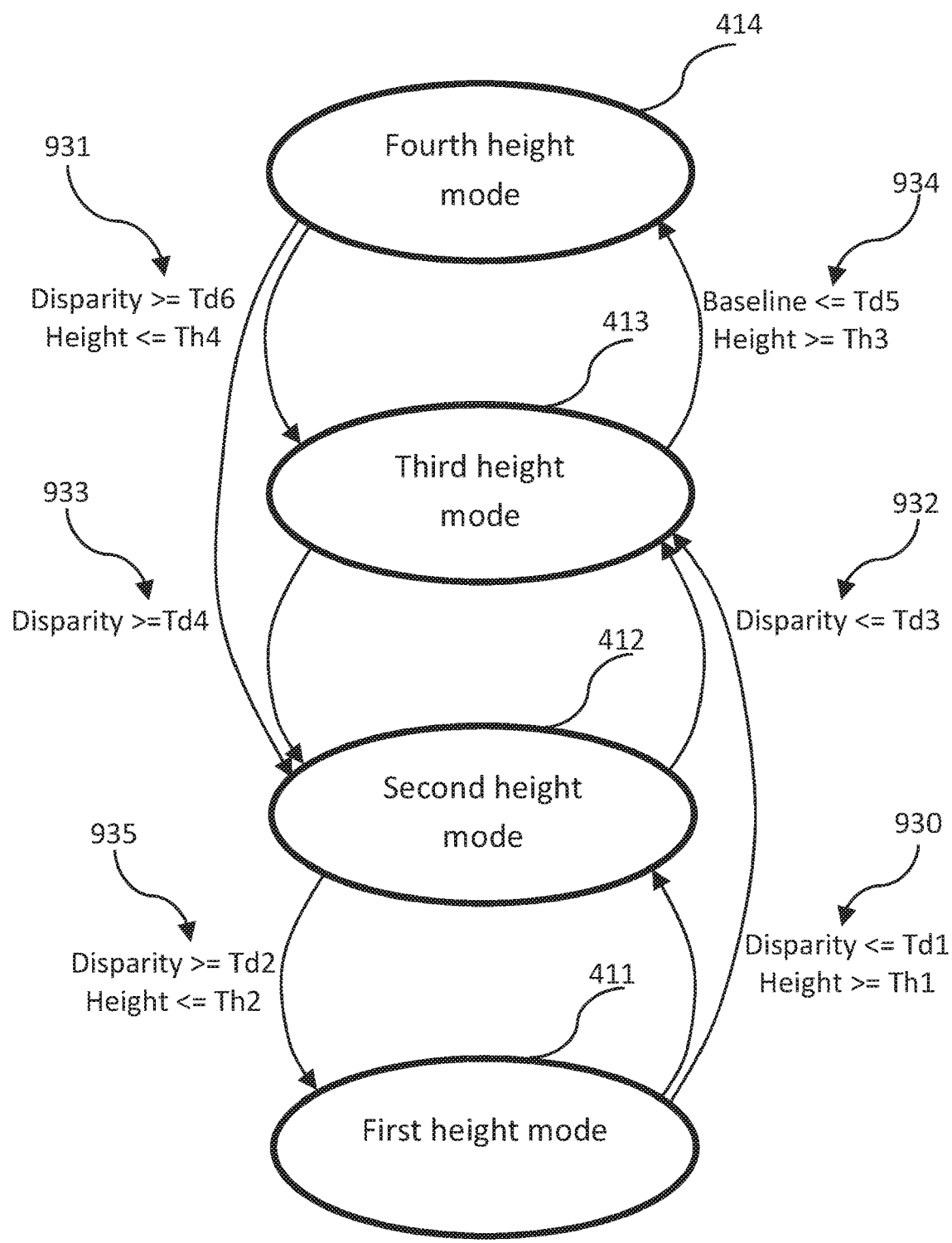
FIG. 8 is an exemplary flowchart of another embodiment of the method of FIG. 1, illustrating switching conditions among four different operation modes.

FIG. 8 shows another exemplary embodiment for the method 100, where four operation modes can be selected (or switched) based on the height 121 and/or the disparity 122. Upon lifting off, the mobile platform 200 (shown in FIG. 2) can operate at a first height. An apparatus for selecting an operation mode of the mobile platform 200 can work with a corresponding operation mode, i.e. a first height mode 411. As shown and described with reference to FIG. 4, the first height mode 411 is a very low altitude monocular mode combining with a distance sensor (not shown) for selecting an operation mode of the mobile platform 200.

When operating under the first height mode 411 and two conditions are met, at 930, the mobile platform 200 can switch to a second height mode 412. The two conditions can include that the disparity 122 of the binocular imaging device 254 is less than or equal to a first disparity threshold Td1 and the height 121 of the mobile platform 200 elevates above a first height threshold Th1. In another embodiment, the operation mode can be switched from the first height mode 411 to the second height mode 412 when only the height 121 of the mobile platform 200 elevates above a first height threshold Th1.

The first disparity threshold Td1 can be selected from a first disparity range of sixty-two centimeters (62 cm) to eighty-two centimeters (82 cm), and, in some embodiments, to be seventy-two centimeters (72 cm). The first height threshold Th1 can be selected from a value in a first height range of twenty centimeters (20 cm) to eighty centimeters (80 cm) and, in some embodiments, to be fifty centimeters (50 cm).

When the disparity 122 of the binocular imaging device of the stereo vision system is less than or equal to a third disparity threshold Td3 the mobile platform 200 can switch to a third height mode 413. As shown and described with reference to FIG. 4, the third height mode 413 can comprise a high resolution binocular mode.

The third disparity threshold Td3 can be selected from a third disparity range of five centimeters (5 cm) to fifteen centimeters (15 cm) and, in some embodiments, to be ten centimeters (10 cm).

When two conditions are met, at 934, the operation mode can be switched to a fourth height mode 414. The two conditions can comprise that the disparity 122 of the binocular imaging device of the stereo vision system being less than or equal to a fifth disparity threshold Td5 and the height of the mobile platform 200 elevating above a third height threshold Th3. The fourth height mode 414 can comprise a high altitude monocular operation mode, which can utilize a barometer, a GPS and/or vision detector as shown and described above with reference to FIG. 4. In another embodiment, the operation mode can be switched from the third height mode 413 to the fourth height mode 414 when only the height 121 of the mobile platform 200 elevates above a third height threshold Th3.

The fifth disparity threshold Td5 can be selected from a value in a fifth disparity range of one centimeter (1 cm) to three centimeters (3 cm), and, in some embodiments, to be two centimeters (2 cm). The third height threshold Th3 can be selected from a value in a third height range of fifteen meters (15 m) to twenty-five meters (25 m) and, in some embodiments, to be twenty meters (20 m).

When operating with the fourth height mode 414, the mobile platform 200 can switch to other operation modes when any of certain conditions 931, 933 is satisfied. At 931, when the disparity 122 is greater than equal to a sixth disparity threshold Td6 and the height 121 of the mobile platform 200 is less than or equal to a fourth threshold Th4, for example, the mobile platform 200 can switch to the third height mode 413. In another embodiment, the mobile platform 200 can switch to the third height mode 413 when only the height 121 of the mobile platform 200 becomes less than or equal to the fourth threshold Th4.

At 933, when the disparity 122 is greater than or equal to a fourth disparity threshold Td4, the mobile platform 200 can switch to the second height mode 412.

The sixth disparity threshold Td6 can be selected from a value in a sixth disparity range of one and a half centimeters (1.5 cm) to four centimeters (4 cm), and, in some embodiments, to be two and a half centimeters (2.5 cm). The fourth height threshold, Th4, can be selected from a value in a fourth height range of fifteen meters (15 m) to twenty-two meters (22 m) and, in some embodiments, to be eighteen meters (18 m). The fourth disparity threshold Td4 can be selected from a value in a fourth disparity range of nine centimeters (9 cm) to fifteen centimeters (15 cm) and, in some embodiments, to be twelve centimeters (12 cm).

When operating at the third height mode 413, if the disparity 122 gets greater than or equal to the fourth disparity threshold Td4, the mobile platform 200 can switch to the second height mode 412.

When operating with the second height mode 412, the mobile platform 200 can switch to the first height mode 411 when conditions at 935 are satisfied. At 935, when the disparity 122 is greater than or equal to a second disparity threshold Td2 and the height 121 of the mobile platform 200 is less than or equal to a second height threshold Th2, the mobile platform 200 can switch to the first height mode 411. In another embodiment, the mobile platform 200 can switch to the first height mode 411 when only the height 121 of the mobile platform 200 becomes less than or equal to the second threshold Th2.

The second disparity threshold Td2 can be selected from a value in a second disparity range of sixty centimeters (60 cm) to eighty centimeters (80 cm), and, in some embodiments, to be seventy centimeters (70 cm). The second height threshold, Th2, can be selected from a value in a second height range of twenty-five centimeters (25 cm) to sixty-five centimeters (65 cm), and, in some embodiments, to be forty-five centimeters (45 cm).

The second disparity threshold Td2 can be greater than the first disparity threshold Td1. One or both of the first and second disparity thresholds Td1, Td2 can be greater than one or both of the third and fourth disparity thresholds Td3, Td4. The first height threshold Th1 can be greater than the second height threshold Th2. One or both of the first and second height thresholds Th1, Th2 can be greater than one or both of third and fourth height thresholds Th3, Th4. The third disparity threshold Td3 can be greater than the fourth disparity threshold Td4. One or both of the third and fourth disparity thresholds Td3, Td4 can be greater than one or both of the fifth and sixth disparity thresholds Td5, Td6. The sixth disparity threshold Td6 can be greater than the fifth disparity threshold Td5.

Figure 9:
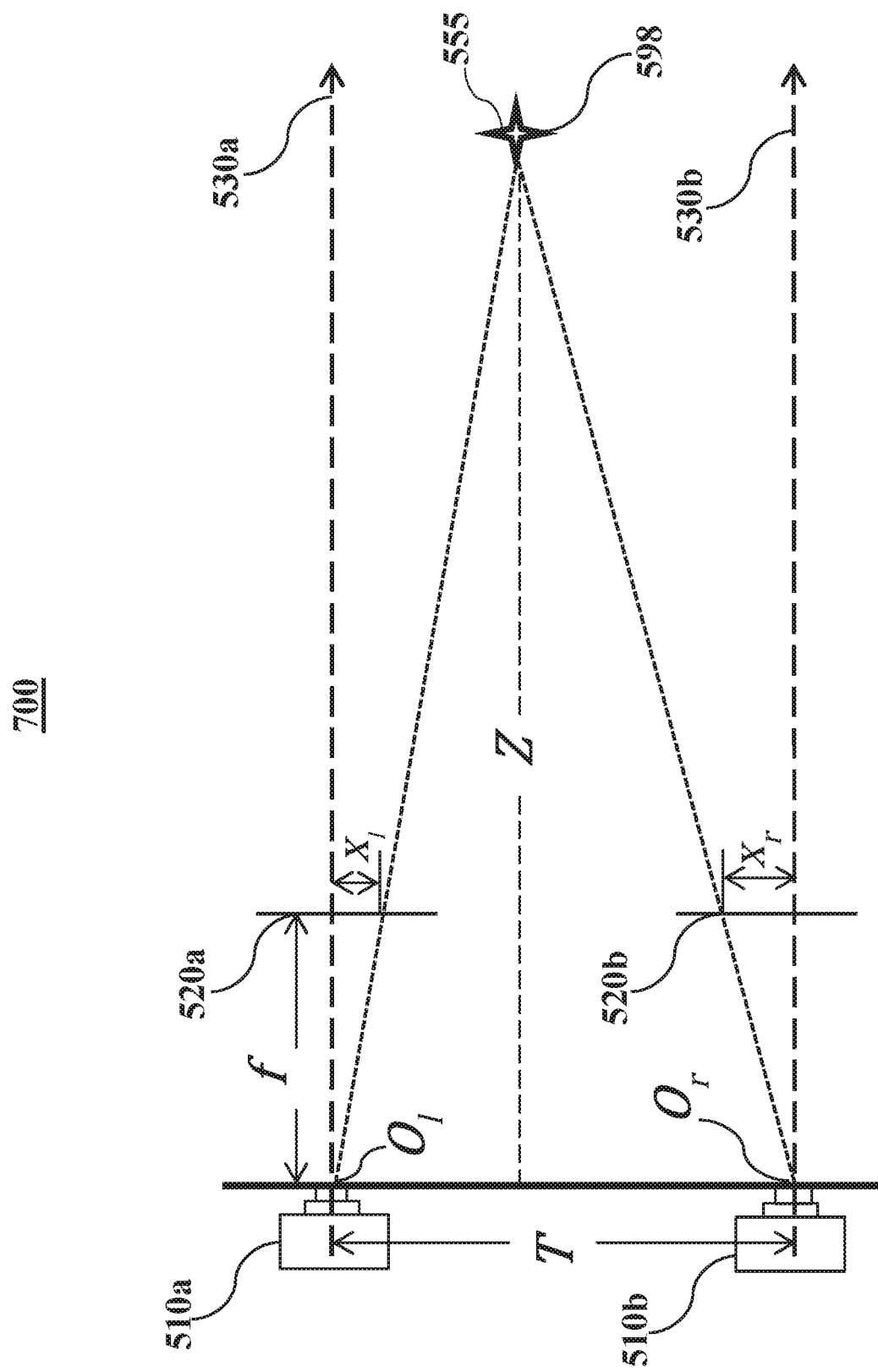
FIG. 9 is an exemplary detail drawing illustrating an embodiment of a stereoscopic imaging method, wherein the disparity of the method of FIG. 1 is decided.

FIG. 9 shows an exemplary method 700 for ascertaining a binocular disparity between two stereoscopic images 520a, 520b, acquired by two lenses 510a, 510b, of an object 598 of interest. A method of triangulation can be used to ascertain the disparity d between the images 520a and 520b. Specifically, the position of the object 598 of interest having an index i, represented by its coordinates ($X_i$, $Y_i$, $Z_i$), can be given as follows:

$$X_i = \frac{T}{d}(x_i^l - c_x), \quad \text{Equation (1)}$$

$$Y_i = \frac{T}{d}(y_i^l - c_y), \quad \text{Equation (2)}$$

$$Z_i = \frac{T}{d}f, \quad \text{Equation (3)}$$

where $c_x$ and $c_y$ represent respective center $O_l$, $O_r$ coordinates of the lenses 510a and 510b, $x_i$ and $y_i$ represent the coordinates of the object 598 of interest in each of the images 520a and 520b respectively, T is the baseline (in other words, the distance between the center coordinates of the lenses 510a and 510b), f is a rectified focal length of the lenses 510a and 510b, i is an index over multiple objects of interest 598 and/or over multiple feature points 355 (shown in FIG. 10) of the object 598 of interest, and d is the binocular disparity between the images 520a and 520b, represented here as:

$$d_i = s_i^l - x_i^r \quad \text{Equation (4)}$$

Based on the discussion for FIG. 9, the disparity d can be calculated by matching the point $X_r$ on the second image 520b with $X_l$ of the first image 520a, wherein $X_l$ is a known element. In FIG. 9, an exemplary embodiment of locating the matching point $X_r$ on the second image 520b is set forth for illustrative purposes only. In FIG. 9, $I^L$ represents the first image 520a, and $I^R$ represents the second image 520b of the same object 598 of interest. A point $x_i^l$ on the first image 520a can be known, and a matching point $x_i^r$ on the second image 520b can be defined as a point that is "most similar" to the point $x_i^l$, of the first image 520a, which can be represented with the following equation:

$$d = \mathrm{argmin}_d |I^L(x_l) - I^R(x_l + d)|, \quad \text{Equation (5)}$$

where d represents the disparity of the two lenses 510a, 510b, $I^L$ refers to the first image 520a, $I^R$ refers to the second image 520b of the same object 598 of interest, $x_l$ is the point $x_i^l$ of the first image 520a.

Because of possible matching errors to ascertain matching accuracy and vision range, the disparity d cannot be less or greater than certain predetermined values. In some embodiments, the disparity d is greater than 5 pixels and less than one fifth of a width of the second image 520b, which can be the same size with the first image 520a. As an illustrative example, suppose f=480, T=0.15 m, and image resolution is 320×240 pixels, an effective vision range of 1.5 m to 15.4 m can be deducted.

FIG. 10 illustrates an exemplary embodiment of the method 700 for matching a point of the second image 520b with a corresponding point 355 of the first image 520a. In FIG. 10, a three-by-three pixel block is taken with the compared point in the center from each of the images 520a, 520b. When the first and second images 520a and 520b are color images, values of color components can be compared for each pixel of the three-by-three pixel block. Conversely, when the images 520a and 520b are black and white images, greyscale values for each pixel can be compared. Based on Equation 5, the point with smallest sum of value differences for all nine pixels can be selected as the matching point. This process can be repeated for all selected feature points on the first image 520a.

In some embodiments, a method of using Binary Robust Independent Elementary Features ("BRIEF") descriptors can be used for matching the point of the second image 520b with the corresponding point 355 of the first image 520a. In an exemplary embodiment, a first binary string, representing a first region around the selected feature point of the first image 520a, can be built by comparing intensities of each point pairs of the region. The first binary string can be the first BRIEF descriptor of the selected feature point of the first image 520a.

Similarly, a second binary string representing a second region around the point 355 of the second image 520b can be built by comparing intensities of each point pairs of the second region. The second binary string can be a second BRIEF descriptor.

A similarity between the selected feature point of the first image 520a and the point 355 of the second image 520b can be calculated by comparing a hamming distance between the first BRIEF descriptor and the second BRIEF descriptor. The point 355 of the second image 520b can be determined as matching the selected feature point of the first image 520a when a hamming distance between the first BRIEF descriptor and the second BRIEF descriptor is less than a first hamming threshold.

Figure 11:
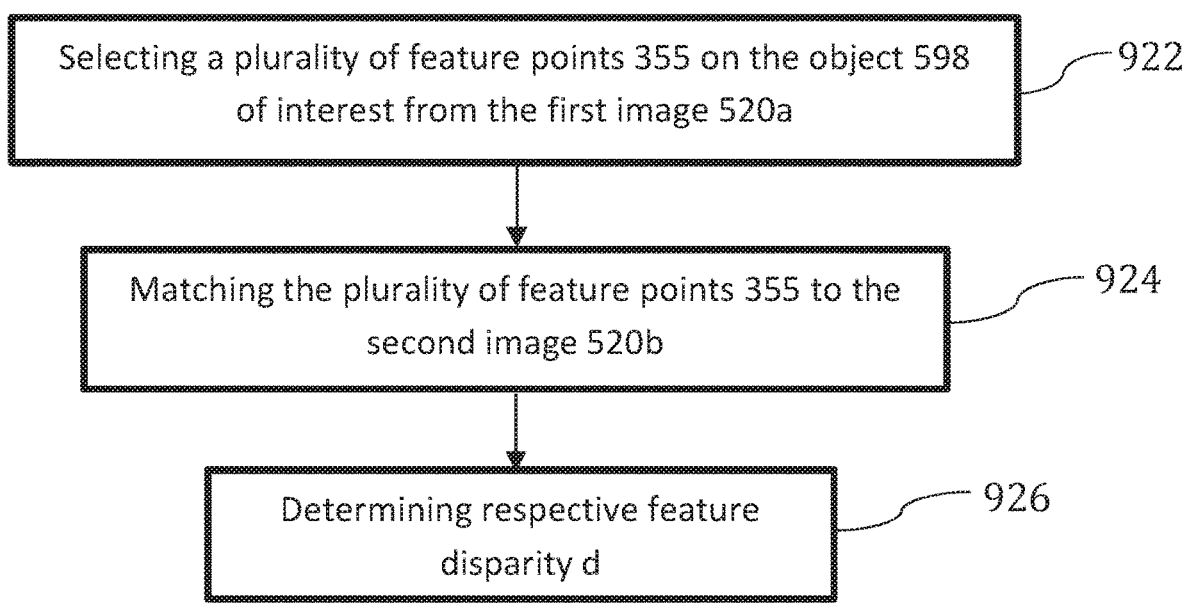
FIG. 11 is an exemplary diagram illustrating another embodiment of the method of FIG. 9, wherein a first image is matched with a second image with a plurality of feature points.

Turning now to FIG. 11, an exemplary embodiment of the method 700 for acquiring the disparity d via feature points 355 of the object 598 of interest is illustrated. At 922, a plurality of feature points 355 on the object 598 of interest can be selected. The feature points 355 can be selected using one or more of a variety of different methods. In one exemplary embodiment, the feature points 355 can be identified as pre-defined shapes of the object 598 of interest. In another embodiment, the feature points 355 can be recognized as one or more portions of the object 598 of interest having a particular color or intensity. In another embodiment, the feature points 355 can be selected as random portions of the object 598 of interest. In another embodiment, the feature points 355 can be selected at regularly spaced intervals on the object 598 of interest, for example, every pixel, every other pixel, every third pixel, every fourth pixel, and so forth. The feature points 355 can take varying shapes and sizes, as desired. In some embodiments, a combination of methods described above can be used to select the feature points 355.

Figure 12:
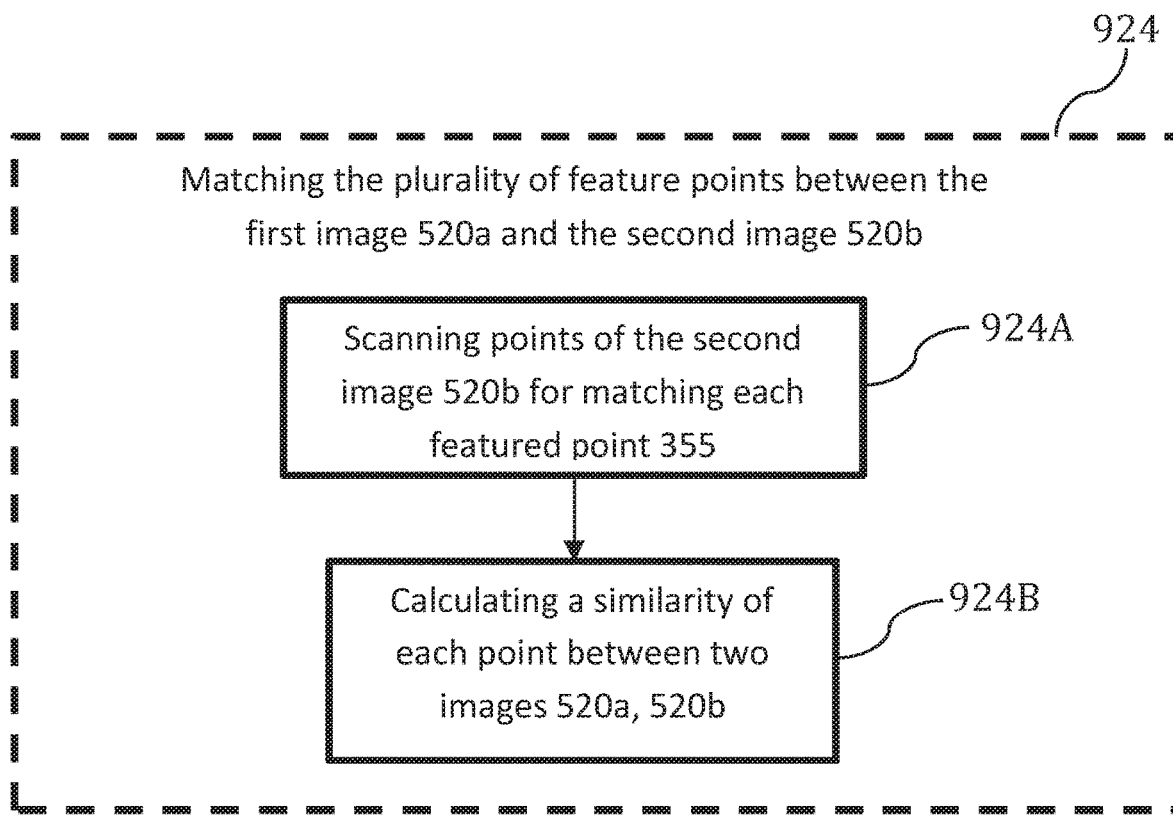
FIG. 12 is an exemplary diagram illustrating another embodiment of the method of FIG. 11, wherein each feature point is matched by calculating a similarity.

At 924, the selected feature points 355 can be matched from the first image 520a onto the second image 520b. In some embodiments, matching of the feature points 355 consists of two procedures as shown in FIG. 12. In FIG. 12, at 924A, a feature point 355 of the first image can selected. A matching point can be scanned starting from a calculated point and along a line parallel to the centered line of the lenses 510a, 510b. The matching starting point can be calculated based on the coordinates of the point on the first image 520a, the direction and/or the length of the baseline. Although in some embodiments limited to only one direction along the selected line, the scanning can be performed in any of one or more predetermined directions.

At 924B, while scanning for each point, a similarity is calculated between two points in the manner shown and described above in detail herein with reference to FIG. 10, and the point 355 of the second image 520b with the minimum sum of differences with the feature point 355 of the first image 520a can be selected as a matching point corresponding to the selected feature point 355.

Returning to FIG. 11, a feature disparity d between each feature points 355 of the two images 520a and 520b can be found, at 926. Any of a variety of methods can be used to determine the disparity d. In one embodiment, the disparity d can be found based on an average of the disparities d for each of the feature points 355. Exemplary types of averages can include an arithmetic mean, a geometric mean, a median, and/or a mode without limitation. In another embodiment, the disparity d can be found by selecting one or more of the feature points 355 and acquiring the disparity d based on the selected feature points 355.

Figure 13:
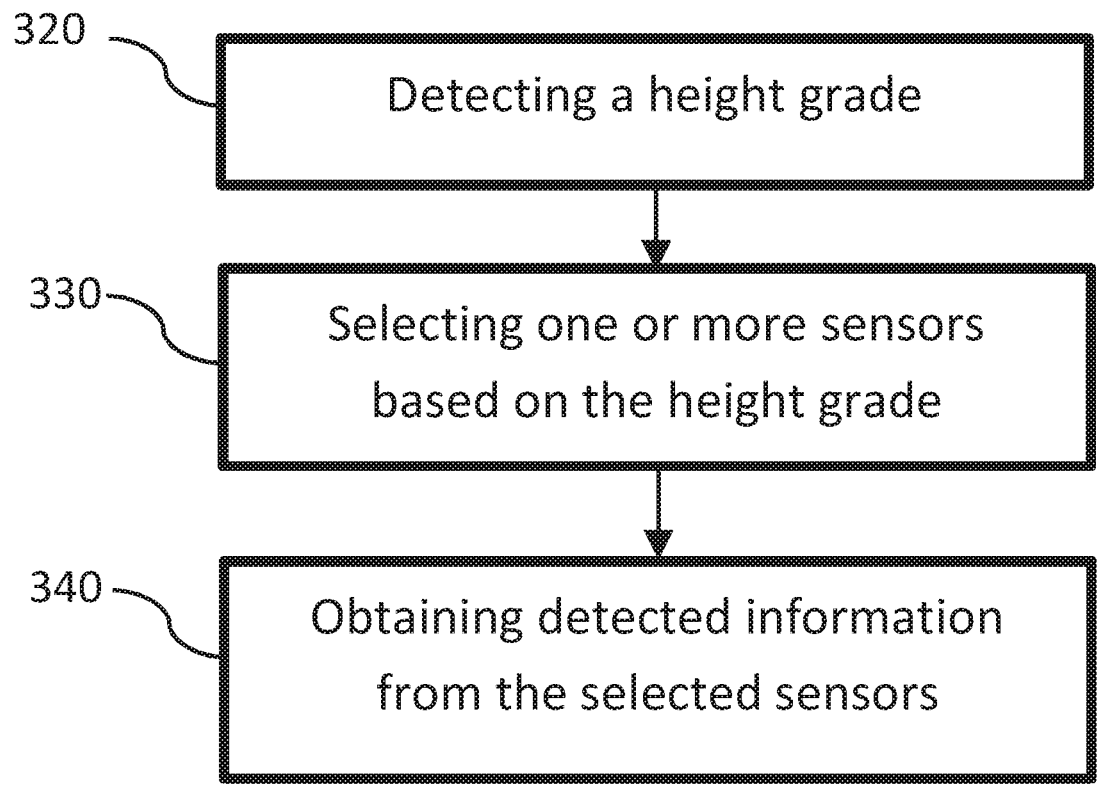
FIG. 13 is an exemplary top-level flowchart of another embodiment of the method for determining an operation mode, wherein sensors of the mobile platform are selected for each of the four operation modes of FIG. 4.

FIG. 13 illustrates an embodiment of a method 300 for determining an operation mode of the mobile platform 200 (shown in FIG. 15), wherein certain sensors 360 (shown in FIG. 15) can be selected for each of the four height modes 411-414 (shown in FIG. 4) based on a height grade. In FIG. 13, at 320, the height grade of the mobile platform 200 can be detected. The height grade of the mobile platform 200 can be detected, for example, in a manner shown and described above with reference to FIGS. 1, 5 and 6. One or more sensors 360 can be selected, at 330, according to the detected height grade, which sensors 360 can be predetermined for the detected height grade. The selection of the sensors 360 is shown and described below in additional detail with reference to FIG. 14. At 340, certain information for operating the mobile platform can be obtained. The information can include, for example, a height of the mobile platform, a distance to an object 288 (shown in FIG. 2), a displacement, a velocity and the like.

Figure 14:
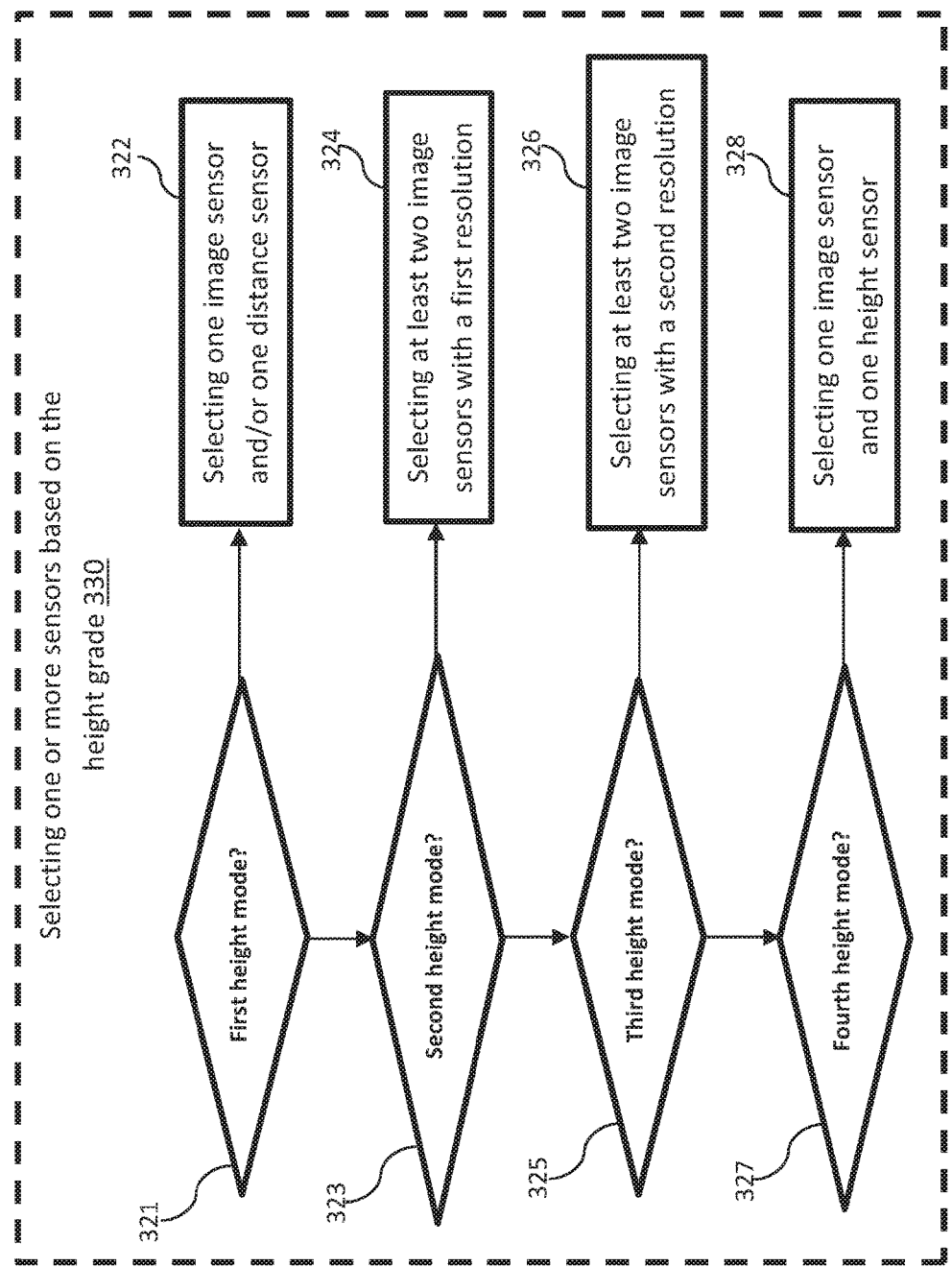
FIG. 14 is an exemplary flowchart of another embodiment of the method of FIG. 13, illustrating a manner for selecting the sensor based upon each of the operation modes.

FIG. 14 shows another embodiment of the method 300 and illustrates the sensor selections for each of the four height modes of FIG. 4. In FIG. 14, when a mobile platform 200 (shown in FIG. 15) detects a height to be within a first height grade, a first height mode 411 (shown in FIG. 4) can be selected, at 321. When the mobile platform 200 selects the first height mode 411, at 321, one image sensor 363 can be selected, at 322. In another embodiment, when the first height mode 411 is selected, at 321, one image sensor 363 and a distance sensor 361 can be selected. The distance sensor 361 can be employed, for example, for determining a distance between the mobile platform 200 and an object 288 (shown in FIG. 2) of interest. Although shown and described as selecting one distance sensor 361 and one image sensor 363 for purposes of illustration only, other suitable types of sensors 360 can be selected for the first height mode 411.

The distance sensor 361 described herein can include, but is not limited to, an ultrasonic detector and/or a laser detection device for detecting a distance.

In FIG. 14, the mobile platform 200 can detect an operating height of a second height grade. Upon detecting the second height grade, the mobile platform 200 can select a second height mode 412 (shown in FIG. 4), at 323. When the mobile platform 200 selects the second height mode 412, at 323, at least two image sensors 363 (shown in FIG. 15) can be selected, at 324. Each of the image sensors 363, selected for the second height mode 412, can have a first resolution.

The mobile platform 200 can detect an operating height of a third height grade. Upon detecting the second height grade, the mobile platform 200 can select a third height mode 413 (shown in FIG. 4), at 325. When the mobile platform 200 selects the third height mode 413, at 325, at least two image sensors 363 can be selected, at 326. Each of the image sensors 363, selected for the third height mode 413, can have a second resolution. The second resolution can be an enhanced resolution that can be greater than the first resolution that is used under the second height mode 412.

The mobile platform 200 can detect an operating height of a fourth height grade. Upon detecting the fourth height grade, the mobile platform 200 can select a fourth height mode 414 (shown in FIG. 4), at 327. When the mobile platform 200 selects the fourth height mode 414, at 327, one image sensor 363 and one height sensor 362 can be selected, at 328. The height sensor 362 can comprise, but is not limited to, a barometer 251 and/or a Global Positioning System ("GPS") 253 (collectively shown in FIG. 6).

Figure 15:
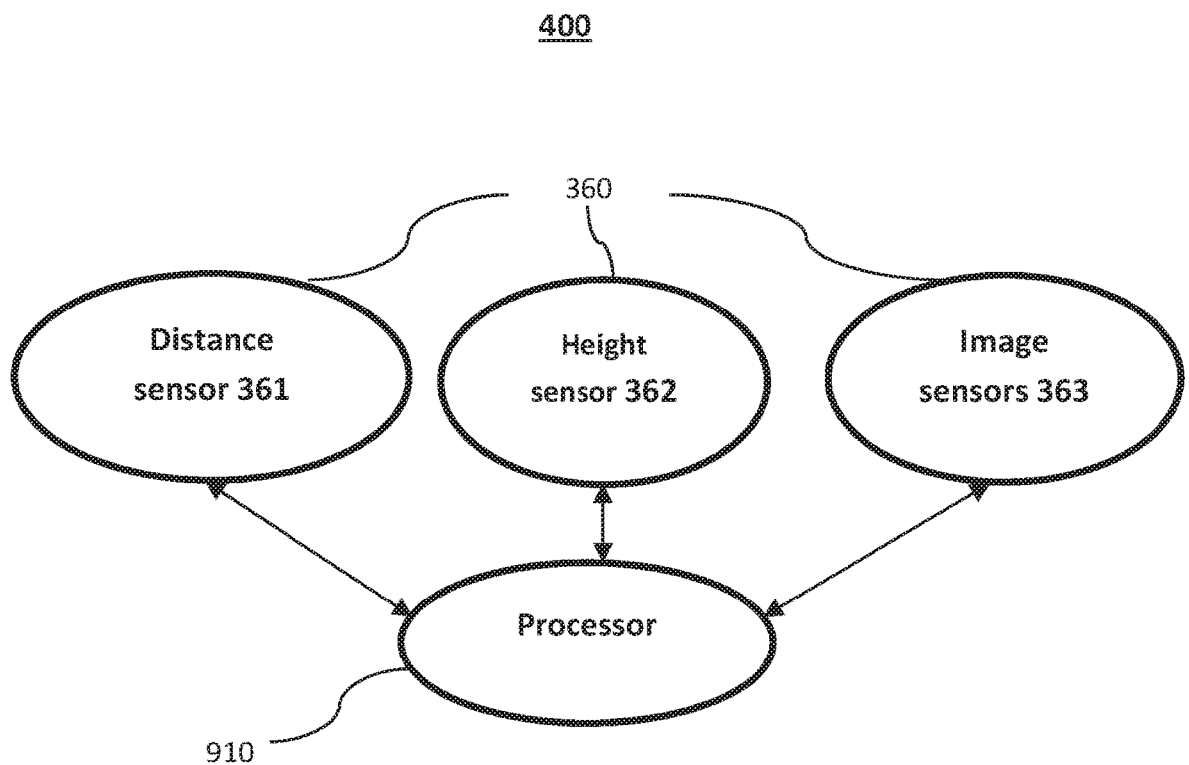
FIG. 15 is an exemplary top-level diagram illustrating still another embodiment of a flying operation system of the mobile platform of FIG. 2, wherein a processor selects sensors of the mobile platform for each of four operation modes.

FIG. 15 shows another alternative embodiment of a flying operation system 400 of the mobile platform of FIG. 2, wherein the processor 910 (shown in FIG. 7) can be configured for selecting one or more sensors 360 in accordance with the method 300 (shown in FIGS. 13 and 14). Turning to FIG. 15, a distance sensor 361, a height sensor 362 and one or more image sensors 363 can be associated with, and communicate with, the processor 910. As described above with reference to FIG. 14, the distance sensor 361 can include, but is not limited to an ultrasonic detector 252 (shown in FIG. 7) and/or a laser detection device. The height sensor 362 can include, but is not limited to a barometer 251 and/or a Global Positioning System ("GPS") 253 (collectively shown in FIG. 7). The image sensors 363 can include, but are not limited to, a binocular imaging device 254 (shown in FIG. 2).

In some embodiments of the flying operation system 400, the processor 910 can be provided for obtaining and processing the measurements obtained from the sensors 360. Such measurements can include, but are not limited to, a distance to an object 288 (shown in FIG. 2), the height 121 and/or the disparity 122 (collectively shown in FIG. 1). Based on the measurements, the processor 910 can determine which operation mode can be selected and which one or more predetermined sensors 360 can be included for the selected operation mode.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for selecting an operation mode of an unmanned aerial vehicle (UAV) having a processor, comprising:
assigning an initial mode to the operation mode of the UAV, the initial mode being selected from a plurality of height modes;
determining, by the processor, a height grade of the UAV, including:
in response to the operation mode of the UAV being a first height mode or a fourth height mode, determining a height of the UAV according to measurement data received from one or more of a barometer, an ultrasonic detector, and a Global Positioning System (GPS) device, and determining the height grade according to the height of the UAV;
in response to the operation mode of the UAV being a second height mode, calculating, by the processor, a disparity between a first image and a second image of a remote object, the first and the second images being captured by a binocular imaging device operated in a normal-resolution mode, and determining the height grade according to the disparity between the first image and the second image; and
in response to the operation mode of the UAV being a third height mode, calculating, by the processor, a disparity between a third image and a fourth image of the remote object, the third and the fourth images being captured by the binocular imaging device operated in a high-resolution mode, and determining the height grade according to the disparity between the third image and the fourth image; and
updating, by the processor, the operation mode of the UAV according to the determined height grade, the operation mode being selected from the plurality of height modes.

2. The method of claim 1, wherein the first height mode is a very low altitude monocular mode.

3. The method of claim 1, wherein updating the operation mode of the UAV includes:
switching the operation mode of the UAV from the first height mode to the second height mode when the height is greater than a first height threshold.

4. The method of claim 1, wherein updating the operation mode of the UAV comprises switching the operation mode of the UAV from the second height mode to the first height mode when the disparity is greater than a second disparity threshold.

5. The method of claim 1, wherein updating the operation mode comprises switching the operation mode from the second height mode to the third height mode when the disparity is less than or equal to a third disparity threshold.

6. The method of claim 1, wherein updating the operation mode comprises switching the operation mode from the third height mode to the second height mode when the disparity is greater than a fourth disparity threshold.

7. The method of claim 1, wherein updating the operation mode comprises switching the operation mode from the third height mode to the fourth height mode when the when the disparity is less than a fifth disparity threshold.

8. The method according to claim 1, wherein the plurality of height modes includes one or more of: the first height mode, the second height mode, the third height mode, and the fourth height mode.

9. The apparatus of claim 8, wherein the first height mode is a very low altitude monocular mode.

10. The apparatus of claim 8, wherein:
the processor is configured to switch the operation mode of the mobile platform from the first height mode to the second height mode when the height is greater than a first height threshold.

11. The apparatus of claim 8, wherein the processor is configured to switch the operation mode of the mobile platform from the second height mode to the first height mode when the disparity is greater than a second disparity threshold.

12. The apparatus of claim 8, wherein the processor is configured to switch the operation mode of the mobile platform from the second height mode to the third height mode when the disparity is less than or equal to a third disparity threshold.

13. The apparatus of claim 8, wherein the processor is configured to switch the operation mode of the mobile platform from the third height mode to the second height mode when the disparity is greater than a fourth disparity threshold.

14. The apparatus of claim 8, wherein the processor is configured to switch the operation mode of the mobile platform from the third height mode to the fourth height mode when the disparity is less than a fifth disparity threshold.

15. An apparatus for selecting an operation mode of a mobile platform, comprising:
a binocular imaging device associated with the mobile platform; and
a processor configured to:
assign an initial mode to the operation mode of the UAV, the initial mode being selected from plurality of height modes;
detect a height grade of the mobile platform, including:
in response to the operation mode of the UAV being a first height mode or a fourth height mode, determining a height of the UAV according to measurement data received from one or more of a barometer, an ultrasonic detector, and a Global Positioning System (GPS) device, and determining the height grade according to the height of the UAV;
in response to the operation mode of the UAV being a second height mode, calculating, by the processor, a disparity between a first image and a second image of a remote object, the first and the second images being captured by a binocular imaging device operated in a normal-resolution mode, and determining the height grade according to the disparity between the first image and the second image; and
in response to the operation mode of the UAV being a third height mode, calculating, by the processor, a disparity between a third image and a fourth image of the remote object, the third and the fourth images being captured by the binocular imaging device operated in a high-resolution mode, and determining the height grade according to the disparity between the third image and the fourth image; and
update the operation mode of the mobile platform according to the determined height grade, the operation mode being selected from the plurality of height modes.

16. The apparatus according to claim 15, wherein the plurality of height modes includes one or more of: the first height mode, the second height mode, the third height mode, and the fourth height mode.

* * * * *